United States Patent [19]

Hingley

[11] 4,264,295
[45] Apr. 28, 1981

[54] INJECTION MOULDING

[75] Inventor: George A. Hingley, Wilmington, England

[73] Assignee: Wells & Hingley (Plating) Limited, London, England

[21] Appl. No.: 69,340

[22] Filed: Aug. 23, 1979

[30] Foreign Application Priority Data

Aug. 25, 1978 [GB] United Kingdom ............... 34617/78
Jun. 29, 1979 [GB] United Kingdom ............... 22767/79

[51] Int. Cl.³ ........................... B29F 1/00; B29C 1/00
[52] U.S. Cl. .................................... 425/577; 425/573; 425/468; 249/107; 264/328.8
[58] Field of Search ............... 425/556, 573, 577, 588, 425/589, 468, DIG. 5

[56] References Cited

U.S. PATENT DOCUMENTS

| | | | |
|---|---|---|---|
| 3,374,503 | 3/1968 | Boniger | 425/468 X |
| 3,397,266 | 8/1968 | Ayres . | |
| 3,473,197 | 10/1969 | Wilds et al. | 425/577 |
| 3,481,002 | 12/1969 | Dreps | 425/468 X |
| 3,509,603 | 5/1970 | Halsall et al. | 425/577 |
| 3,673,302 | 6/1972 | Halsall et al. . | |
| 3,816,181 | 6/1974 | Buckethal . | |
| 3,995,008 | 11/1976 | Spiegelberg | 425/573 X |
| 4,063,007 | 12/1977 | Spiegelberg . | |

FOREIGN PATENT DOCUMENTS 2130131 12/1972 Fed. Rep. of Germany .
1479474 5/1974 Fed. Rep. of Germany .

Primary Examiner—J. Howard Flint, Jr.
Attorney, Agent, or Firm—Fleit & Jacobson

[57] ABSTRACT

In the moulding of plastics material using a female mould cavity into which a number of cores are inserted, in order to prevent deflection of the cores under the action of the injected plastics material, complementarily shaped formations are provided on the free ends of the cores and the mould wall, the formations being so disposed and arranged as to produce restoring forces tending to reduce deflection of the cores and to prevent transmission of deflection between adjacent cores. Various examples of suitable formations are disclosed. The invention is illustrated with reference to its application to the manufacture of battery boxes.

17 Claims, 4 Drawing Figures

INJECTION MOULDING

The present invention relates to the manufacture of articles by injection moulding plastics material.

In moulding articles having internal cavities it is usual to use a female mould into which extend one or more so called cores which together with the female mould wall define the moulding space or spaces. One difficulty which arises is the deflection of the core(s) under imbalanced pressure of the plastics being injected. As the plastics material starts to cool and hence solidify as soon as it touches the mould walls and core(s), the core(s) cannot usually recover their original positions before the article is ejected from the mould.

As a result of the core deflection, the solidified plastics becomes wedged between the core and the female mould wall or an adjacent core. This makes it very difficult, if not impossible, to release the article intact from the mould. The problem is more acute where there are a number of cores side by side, as deflection of one core can be transmitted to an adjacent one and so on, increasing the number of wedged plastics material parts which have to be released.

It is an object of the invention to overcome or at least to mitigate the above described problem of core deflection.

Apparatus for injection moulding plastics material to form an article incorporates the improvement that there is associated with the free end of the or each deflectable core one or more formations on the wall of the internal cavity and/or on the core, the formation or formations being so disposed and arranged that, during moulding, the sequence of filling of the space surrounding the core is such that the free end of the core is first entrained by a mass of the injected plastics material so that during subsequent filling of the remainder of the space surrounding the core, deflection of the core under the action of the injected plastics material results in a pressure imbalance tending to reduce the deflection of the core.

The invention also provides a method of injection moulding plastics material to form an article comprising the steps of inserting into a female mould cavity one or more deflectable (as herein defined) cores to define a moulding space and injecting plastics material into the moulding space, wherein the free end of the or each deflectable core has one or more formations associated with it on the core and/or on the wall of the cavity and so disposed and arranged that the sequence of filling of the space surrounding the core is such that the free end of the core is first entrained by a mass of the injected material and so that during subsequent filling of the remainder of the space surrounding the core, in response to deflection of the core under the pressure of the injected plastics material, a pressure imbalance is produced tending to reduce the deflection of the core.

By a "deflectable" core there is meant a core which, in the absence of the formation or formations would be liable to be deflected as described above.

Preferably, the formations are complementarily shaped formations on the wall of the mould cavity and core. The formations may, for example, comprise ridges on the end face of the mould cavity or on the end of the or each core. In these circumstances suitably there is associated with each ridge a correspondingly shaped cut-away on the associated core or on the end face of the mould cavity. The ridges may be of inverted "V" shape i.e. defined by two planar surfaces which are oppositely inclined relative to the end face of the mould cavity or be defined by two opposed arcuately, preferably convexly curved surfaces.

The formations on the core or cores are conveniently located at the junctions between its end face and the two opposed lateral surfaces of the core which constitute the major surfaces of the core.

One area of application of the present invention is the manufacture of battery boxes e.g. for car batteries; the battery box forms the body of the battery and is provided with a number of adjacent internal compartments which in the completed battery, contain the cell plates. In this and other applications where a number of relatively long cores need to be used the present invention may assist in releasing the moulded box from the mould. At least some of the formations may be arranged to prevent the transmission of deflection between adjacent cores.

The invention will be further described by way of example with reference to the accompanying drawings, in which.

Figure 1:
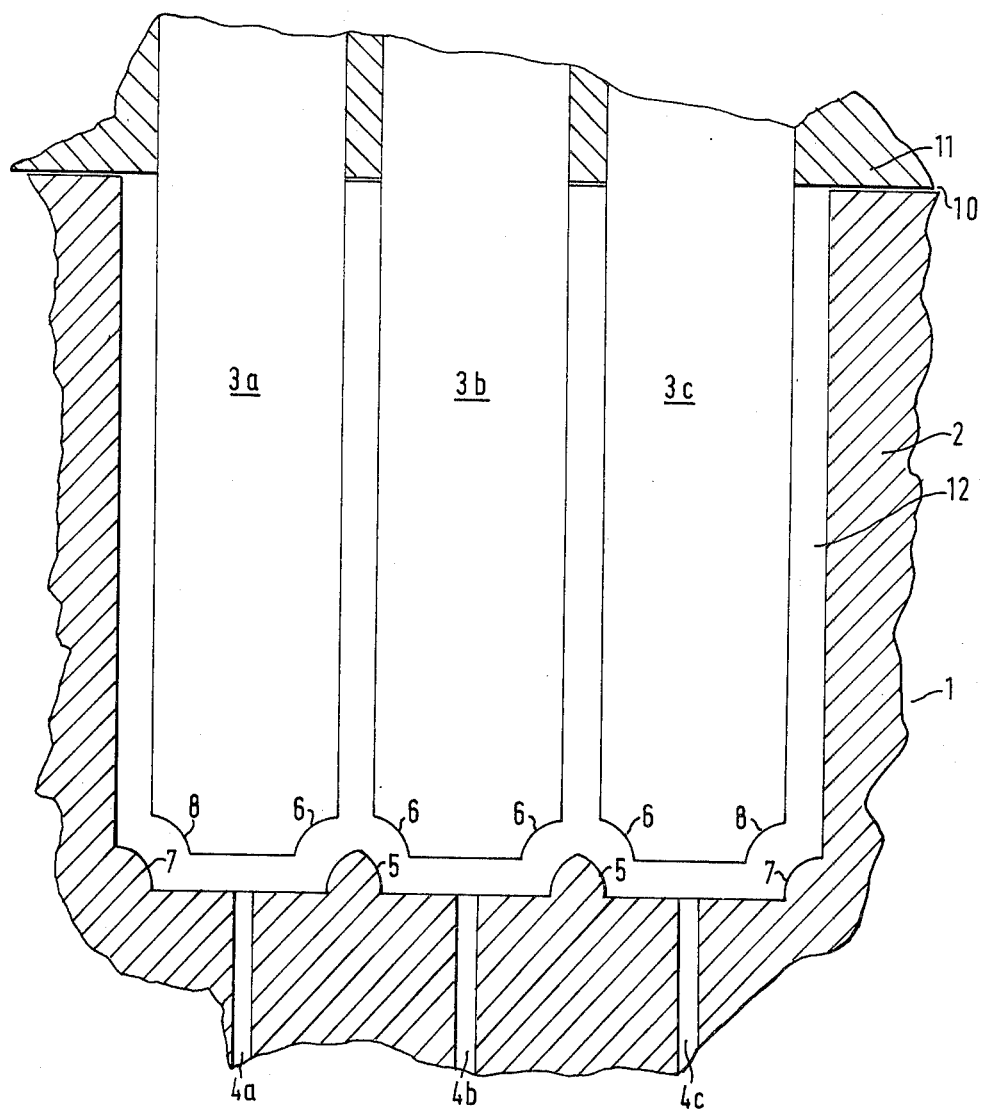
FIG. 1 is a very schematic longitudinal section through one embodiment of the invention.

In FIG. 1 the mould 1 which is for moulding a car battery case comprises a female mould part 2 having a generally rectangular internal cavity 12 which, during moulding, is closed by a male mould part 10 which comprises a plate 11 and a number of crose 3a–3c which depend into the female mould cavity. Each of the cores 3a–3c is elongate in a direction perpendicular to the plane of the figure and extends substantially across the entire width (in that direction) of the female mould cavity (except, of course, distances at each side corresponding to the thickness of the outer walls of the case to be moulded). The major surfaces of the cores, and thus their maximum width dimensions therefore extend perpendicular to the plane of FIG. 1.

At the junctions of the major surfaces of the cores 3a, b, c and the free end faces of the cores, the cores have formations provided by concavely arcuate cross-section cut-aways such as 6 and 8 which cooperate with correspondingly convexly arcuate cross-section ridges 5, 7 which extend across the end face of the female mould cavity, in directions parallel to the major surfaces of the cores, to restrain the cores 3a, b, c against deflection during the injection step.

As shown in FIG. 1 the ridges 5 and 7 extend upwardly beyond the lower free end faces of the cores 3a, b, and c to enhance their stabilising effect. In an alternative version where the ridges are provided on the core legs and the cut-aways on the female mould core wall, the ridges may similarly extend into the cut-away zone (i.e. beyond the plane of the wall of the cavity).

Molten plastics such as polypropylene is injected under pressure into the mould cavity via nozzles such as 4a, b, c which are preferably, but not necessarily, located facing the centre of the end face of respective ones of the cores. As it starts to solidify on contact with the mould walls, the plastics tends to travel up the centre of each of the passageways between the cores and the female mould wall.

An appreciation of the manner in which the present invention assists in reducing or eliminating core leg deflection can be gained by considering what happens to the core leg 3b during the injection process. The end face of the core leg 3b, the corresponding portion of the end face of the female mould cavity and the adjacent ridges 5 defined a confined, initially empty, space. The inlet 4b opens into this space so that as injection commences it is this space (and the corresponding spaces associated with the core legs 3a and 3c) which is filled first with the molten plastics material. The free end of the core leg 3b thus becomes entrained by a mass of the injected plastics material. The injected plastics material starts to cool and solidify as soon as it contacts the walls bounding this space so that the effective cross sectional area of the flow path of the plastics material is substantially reduced. As the space surrounding the core leg 3b towards the end plate 11 fills, if by virtue an asymmetry of the flow of the plastics material from the inlets 4a, 4b and 4c, a pressure imbalance builds up tending to deflect the core leg in the leftward or rightward direction in the Figure, this tends to cause the plastics in the space towards the left (or right, as appropriate) ridge 5 and cut-away 6 to be displaced, which because of the relatively restricted path for the displaced plastics produces a restoring force tending to counteract that caused by the pressure imbalance and so the deflection of the core leg 3b which actually occurs is less than it would be in the absence of the ridges 5 and cut-aways 6. This restoring force is relatively large as the pressure difference acts on the major surfaces of the cores adjacent their free ends.

Similarly, deflection of core 3a causing deflection of core 3b is prevented or at least reduced by the presence of the ridge 5 between them; the relatively viscous nature of the flowing plastics and the fact that as mentioned earlier the plastics in contact with the mould wall tends to start to solidify quickly, combine to resist flowing of plastics material from one side of the ridge 5 to the other, thereby reducing the transmission of deflection between adjacent cores.

Once the injection is completed, the moulded case is allowed to cool sufficiently to prevent it from deforming when removed from the mould and then the mould parts 2, 10 are separated; the case may be released from the male part by, for example, advancing alternate cores 3. The moulded case is open-topped, with a number of internal partitions corresponding to the space between the cores 3.

Many variations of the above embodiment are possible. For example, the cut-aways 6 and 8 and ridges 5 and 7 may be defined by planar surfaces inclined relative to the end faces of the mould cavity 2 so that the ridges 5, for example, would be of inverted V-shape. The ridges and/or the cut-aways can be rectangular in cross-section. Equally, the ridges and cut-aways need not be continuous across the width of the mould cavity. In some applications the ridges and cut-aways can be transposed, the ridges being on the cores and the cut-aways being in the wall of the mould cavity. Also the ridges and cut-aways could be disposed at the centres of the end faces of the cores rather than at the edges; such an arrangement is described below with reference to FIG. 4. In some applications, the cut-aways may be omitted. Any of the above arrangements of ridges (and cut-aways, if any) may be applied to a mould with a single core.

Figure 2:
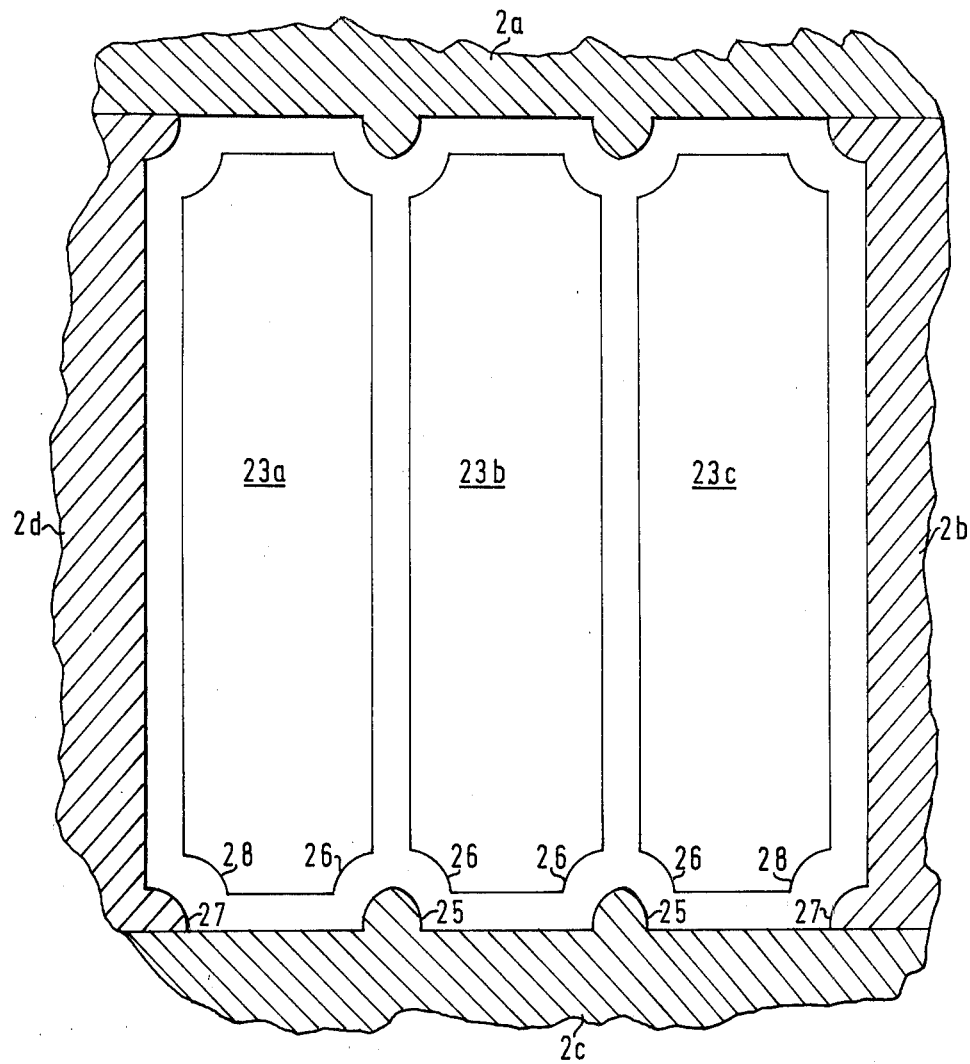
FIG. 2 is a very schematic section through a second embodiment of the invention taken in a plane perpendicular to the axes of the cores.

FIG. 2 shows a section in a plane perpendicular to the cores 23a–c of a second embodiment of the invention. In this embodiment which may also be used to mould a battery box, rather than running in directions parallel to the end face of the cores and the female mould cavity, the ridges 25 and 27 run parallel to the longitudinal axes of, and major and minor surfaces of the cores, 23a–23c. The ridges 25 and 27 are similar in shape to the counterpart ridges 5 and 7 respectively in FIG. 1 and likewise have associated therewith complementarily shaped cut-aways 26 and 28 located along the junctions of the major and minor surfaces of cores 23a–23c. As shown the ridges 25 and 27 project from those side faces of the female mould cavity which face the minor surfaces of the cores. The ridges and cut-aways cooperate in a similar manner as in the embodiment of FIG. 1 to prevent deflection of the cores in the left-right direction in FIG. 2.

The ridges 25 and 27 may have the various different shapes disclosed above in connection with FIG. 1 and may be located at the edges or in the central parts of the faces of the cores on which they are provided. Again, the cut-aways may be omitted, if appropriate. The ridges (and cut-aways, if provided) need not extend along the whole of the free length of the cores but instead some or all may extend from at or near the free ends of the cores to a location partway along the cores, further away from the free end faces of the cores. The ridges 25 and 27 and cut-aways 26 and 28 may if necessary be provided in combination with the ridges 5 and 7 and cut-aways 6 and 8.

FIG. 2 also shows that in this, and the other embodiments of the invention the female mould cavity 12 may be defined by a number of plates 2a–2d (and one defining the end face of the mould cavity) which may be movable away from one another so as to assist in releasing the moulded box.

Figure 3:
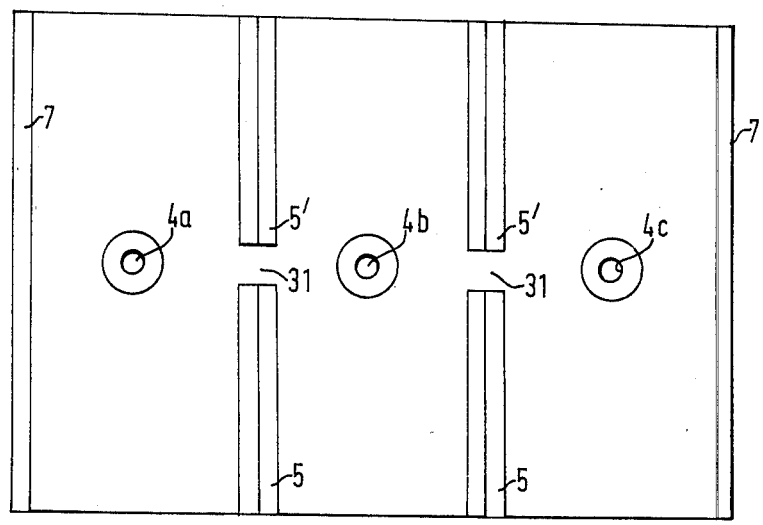
FIG. 3 is an elevational view of the end face of the female mould cavity of an embodiment which is a modification of that of FIG. 1.

FIG. 3 shows the end face of a modified version of the embodiment of FIG. 1. Here, the ridges 5' have centrally disposed cut-aways 31 which communicate the spaces between the end faces adjacent cores and the end face of the female mould cavity. The cut-aways 31 tend to reduce any imbalance in the rates at which these spaces fill up (such an imbalance may be caused by a difference in the rates at which the inlets 4a–c inject plastics into the core 8. These cut-aways 31 may also permit satisfactory moulding if one of the inlets 4a–4c becomes blocked. Provided, of course that the resistance to flow through the cut away 31 is less than that over the top of the ridges 5', even if one of the inlets 4a–4c becomes blocked, as far as the associated core leg is concerned, the space between its end face and the female mould cavity will still be filled first, allowing the reduction in core deflection to be achieved. It is emnvisaged that with the cut-aways 31 it may be possible to use a number of inlets which is less than the number of core legs, e.g. a single inlet may serve to fill the entire mould.

In the embodiment of FIG. 3 the ridges 5' and cut-aways 6 may be arranged in the ways disclosed above in connection with FIG. 1.

Figure 4:
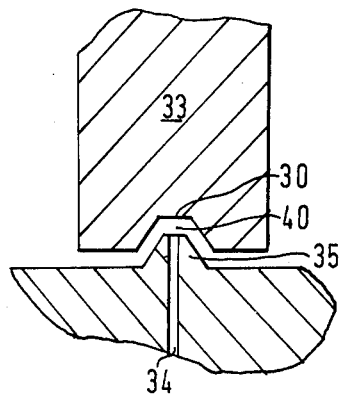
FIG. 4 is a longitudinal section through part of a further embodiment of the present invention.

FIG. 4 shows the end of one of the core legs 33, of a further embodiment of the invention in which the ridge 35 is disposed opposite the centre of the end face of the core leg 33 and has inclined planar side surfaces and a flat top; a corresponding cut-away 31 is provided in the end face of the core leg 33 so that between them is defined a confined space 40 into which plastics is injected from an inlet 34 which opens into the top, flat surface of the ridge 35; during the injection process this space again fills first and because of the manner of flow of the plastics from this space, a restoring force resisting core deflection is again achieved.

I claim:

1. An apparatus for injection moulding plastics material to form an article, the apparatus comprising male and female mould members, the female mould member being a female mould defining an internal moulding cavity having flat wall surfaces, and the male mould member comprising a plurality of deflectable cores each having a free end, a flat end surface and flat side surfaces the respective surfaces of each core facing respective ones of said wall surfaces, the free end being arranged so as, in use, to extend into the cavity so as to define a moulding space into which plastics material can be injected to mould the article; and at least one inlet for plastics material into the mould space; the improvement that there is associated with the free end of each core at least one formation on one of the flat surfaces of one of the mould members, the at least one formation extending beyond the plane defined by the facing flat surface of the other mould member and being so disposed and arranged that, during mouldings, a space is defined at the free end of each core, from which space the flow of plastics to adjacent such spaces is restricted by said at least one formation, the at least one inlet being disposed such that of the volume of the mould, said spaces are first filled so that the free ends of the cores are entrained by respective masses of the injected plastics material so that during subsequent filling of the remainder of the space surrounding the core, deflection of the core under the action of the injected plastics material results in a pressure imbalance tending to reduce the deflection of the core.

2. Apparatus according to claim 1 wherein the formations are complementarily shaped formations on the wall of the mould cavity and core.

3. Apparatus according to claim 1 wherein the female mould cavity and the cores have respective end faces and at least some of the formations are on the cores, are located at the edges of the end face of the associated core and extend parallel to the end face of the female mould cavity.

4. Apparatus according to claim 3 wherein the cores have opposed lateral surfaces and the formations extend in planes parallel to the opposed lateral surfaces of the cores.

5. An apparatus according to claim 1 wherein at least some of the formations extend in directions parallel to the longitudinal axes of the cores.

6. An apparatus according to claim 5 wherein the cores each have major and minor surfaces and at least one such formation which extends parallel to the longitudinal axes of the cores is located at the junctions of major and minor surfaces of the cores.

7. An apparatus according to claim 6 wherein the female mould has lateral surfaces which define the mould cavity facing the minor surfaces of the cores and at least one of the formations which extend parallel to the longitudinal axes of the cores is located on one of said lateral surfaces of the female mould cavity.

8. An apparatus according to claim 6 wherein there are a plurality of such formations which extend parallel to the longitudinal axes of the cores and are located at the junctions of major and minor surfaces of the cores.

9. An apparatus according to claim 8 wherein there are a plurality of inlets for plastic material, each inlet being associated with one core such that the free end of said one core is entrained by the mass of injected plastics material from the associated inlet.

10. Apparatus according to claim 1 wherein the formations comprise ridges on one of said mould members.

11. Apparatus according to claim 10 wherein associated with each ridge there is a correspondingly shaped cut-away on the other of the mould members.

12. Apparatus according to claim 10, in which the ridges are defined by inclined planar surfaces.

13. Apparatus according to claim 10, wherein the ridges are defined by two opposed arcuately curved surfaces.

14. Apparatus according to claim 13, wherein the arcuately curved surfaces are convex.

15. Apparatus according to claim 1 wherein the formations have cut-outs through them to admit plastics material from the at least one inlet into the space between the end face of each core and the adjaent portion of the end face of the female mould cavity.

16. Apparatus according to claim 1, wherein the formations associated with at least one core comprise a ridge on one of the mould members and a corresponding cutaway on the other of the mould members and one of said inlets is disposed to admit plastics material into the space between the ridge and the cut-away.

17. Apparatus according to claim 1, wherein there is a plurality of deflectable cores, with at least some of the formations being arranged to prevent the transmission of deflection between adjacent cores.

* * * * *